Patented Nov. 4, 1924.

1,513,851

UNITED STATES PATENT OFFICE.

PAUL NAWIASKY, OF LUDWIGSHAFEN-ON-THE-RHINE, GERMANY, ASSIGNOR TO BADISCHE ANILIN- & SODA-FABRIK, OF LUDWIGSHAFEN-ON-THE-RHINE, GERMANY.

GREEN VAT DYE AND PROCESS OF MAKING SAME.

No Drawing. Application filed December 12, 1923. Serial No. 680,262.

*To all whom it may concern:*

Be it known that I, PAUL NAWIASKY, a citizen of Austria, residing at Ludwigshafen-on-the-Rhine, Germany, have invented new and useful Improvements in Green Vat Dyes and Processes of Making Same, of which the following is a specification.

As is known, dibenzanthrone can be transformed, by nitration, into a derivative which, either without further treatment or after reduction, can be employed as a vat dyestuff producing valuable green dyeings. The shades thereof, however, are rather dull.

The dyestuff may be recrystallized from nitrobenzene without however substantially altering by this treatment the shade of the dyeings produced and the same dyeings are obtained when subjected to nitration a substantially pure dibenzanthrone such as may be produced by either re-vatting raw dibenzanthrone or effecting the alkali melt of benzanthrone in the presence of aniline or other diluents, as described in the German Patent 290,079.

Notwithstanding these facts, the nitration product of dibenzanthrone, according to this invention, is not uniform but is capable of being separated into a very valuable clear green vat dyestuff on the one hand, and a greenish gray dyestuff, on the other. The separation may be effected by dissolving the nitration product in concentrated sulfuric acid, and fractionally precipitating it therefrom by carefully adding proper diluents, for example dilute sulfuric acid. The valuable clear green dye is precipitated thereby. It is distinguished from the raw product, apart from its clearer hue, by a superior strength and also by its properties. While the raw nitration product dissolves in concentrated sulfuric acid with a dull bluish violet color, the new product dissolves therein bright bluish violet. The new product, after being treated at 180 degrees cetigrade, for 6 hours, with its own weight of anhydrous aluminum chlorid and twenty times its weight of nitrobenzene, still gives green dyeings which on exposure to dilute hypochlorite solution turn black, while the raw nitration product, after the same treatment, dyes bluish gray which remains practically or entirely unaltered by a treatment with hypochlorite.

The following example will serve to further illustrate the invention but the latter is not restricted to these examples. The parts are by weight.

*Example 1.*

100 parts of nitrated raw or pure dibenzanthrone, produced according to patent 796,393, dated August 1, 1905, are dissolved in 1,000 parts of sulfuric acid of 66 degrees Baumé, then 500 parts of sulfuric acid of 60 degrees Baumé strength are slowly added, while stirring, at between about 60 degrees and 80 degrees centigrade. When cool, the mixture is filtered through an acid proof filter-stone, the precipitate is washed with a little sulfuric acid of 63 degrees Baumé and then worked up as usual. It dyes cotton from a pure blue vat pure blue shades which on exposure to the air turn to a clear green. On chlorinating with hypochlorite solution, the dyeing becomes violet gray to violet black.

Water or suitable organic diluents may also be used for the fractional precipitation.

*Example 2.*

505 parts of nitrated dibenzanthrone are dissolved in 700 parts of concentrated sulfuric acid of 66 degrees Baumé. The solution is heated to about 60 degrees centigrade, then 50 parts of water are allowed to run in slowly, the temperature being kept below 75 degrees centigrade. Finally the solution is cooled, filtered and worked up as described in the foregoing example.

Glacial acetic acid may be used instead of water, 25 parts being sufficient under the same conditions.

Now what I claim is:

A new form of nitrated dibenzanthrone in which it dissolves in concentrated sulfuric acid with a pure bluish violet color and in which form it dyes cotton clear green shades and which new form after being treated for 6 hours at 180 degrees centigrade with its own weight of anhydrous aluminum chlorid and 20 times its weight of nitrobenzene, gives green dyeings which by the action of dilute hypochlorite solution turn black.

In testimony whereof I have hereto set my hand.

PAUL NAWIASKY.

Witnesses:
WILHELM SCHERER,
ARTHUR DENONVILLE.

Certificate of Correction.

It is hereby certified that in Letters Patent No. 1,518,851, granted November 4, 1924, upon the application of Paul Nawiasky, of Ludwigshafen-on-the-Rhine, Germany, for an improvement in "Green Vat Dyes and Processes of Making Same," an error appears in the printed specification requiring correction as follows: Page 1, line 81, for the numeral "505" read *50;* and that the said Letters Patent should be read with this correction therein that the same may conform to the record of the case in the Patent Office.

Signed and sealed this 27th day of January, A. D. 1925.

[SEAL.]

KARL FENNING,
*Acting Commissioner of Patents.*